(12) United States Patent
Spieker et al.

(10) Patent No.: US 10,913,436 B2
(45) Date of Patent: Feb. 9, 2021

(54) SYSTEMS AND METHODS FOR REDUCING ENERGY CONSUMPTION WITHIN A BRAKING SYSTEM OF A VEHICLE

(71) Applicant: VEONEER NISSIN BRAKE SYSTEMS JAPAN CO., LTD., Yokohama (JP)

(72) Inventors: Arnie Spieker, Commerce Township, MI (US); Daniel Rasmussen, Flint, MI (US)

(73) Assignee: Veoneer Nissin Brake Systems Japan Co., Ltd., Kanagawa (JP)

( * ) Notice: Subject to any disclaimer, the term of this patent is extended or adjusted under 35 U.S.C. 154(b) by 294 days.

(21) Appl. No.: 15/941,294

(22) Filed: Mar. 30, 2018

(65) Prior Publication Data
US 2019/0299953 A1    Oct. 3, 2019

(51) Int. Cl.
| B60T 13/66 | (2006.01) |
| B60T 7/04 | (2006.01) |
| B60T 8/171 | (2006.01) |
| B60T 13/68 | (2006.01) |
| B60T 8/1755 | (2006.01) |

(52) U.S. Cl.
CPC ............ *B60T 13/662* (2013.01); *B60T 7/042* (2013.01); *B60T 8/171* (2013.01); *B60T 8/1755* (2013.01); *B60T 13/686* (2013.01); *B60T 2220/04* (2013.01); *B60T 2270/30* (2013.01); *B60Y 2306/09* (2013.01)

(58) Field of Classification Search
CPC ...... B60T 7/042; B60T 13/662; B60T 13/686; B60T 2220/04; B60T 8/1755; B60T 8/171; B60T 2270/30; B60Y 2306/09
See application file for complete search history.

(56) References Cited

U.S. PATENT DOCUMENTS 6,913,326 B1 * 7/2005 Ohkubo ................. B60T 7/122
                                                       303/11
9,409,559 B2   8/2016 Ozsoylu et al.
(Continued)

FOREIGN PATENT DOCUMENTS

| JP | 2015-67233 A | 4/2015 |
| JP | 2016-188037 A | 11/2016 |

OTHER PUBLICATIONS

English translation of JP2016188037 (Year: 2016).*
(Continued)

*Primary Examiner* — Bradley T King
*Assistant Examiner* — Mahbubur Rashid
(74) *Attorney, Agent, or Firm* — Carrier Blackman & Associates, P.C.; William D. Blackman; Joseph P. Carrier (57) ABSTRACT

Systems and methods for reducing energy consumption within a braking system are provided. In one example, a method includes detecting an energy reduction condition associated with the braking system of the vehicle; energizing a primary circuit apply valve and a secondary circuit apply valve of the braking system in response to detecting the energy reduction condition; de-energizing a motor of a slave cylinder of the braking system in response to energizing the primary circuit apply valve and the secondary circuit apply valve; and de-energizing the primary circuit apply valve and the secondary circuit apply valve of the braking system in response to de-energizing the motor of the slave cylinder.

10 Claims, 10 Drawing Sheets

(56) References Cited

U.S. PATENT DOCUMENTS

| | | | |
|---|---|---|---|
| 9,656,638 B2 | 5/2017 | Rydsmo et al. | |
| 2001/0038243 A1* | 11/2001 | Isono | B60K 6/365 |
| | | | 303/116.1 |
| 2004/0154419 A1* | 8/2004 | Harries | F16H 61/32 |
| | | | 74/335 |
| 2008/0210496 A1* | 9/2008 | Ishii | B60T 7/042 |
| | | | 188/1.11 E |
| 2008/0223675 A1* | 9/2008 | Hatano | B60T 8/4081 |
| | | | 188/345 |
| 2012/0000738 A1* | 1/2012 | Inoue | B60T 8/4081 |
| | | | 188/106 P |
| 2017/0008497 A1 | 1/2017 | Svensson et al. | |
| 2017/0036651 A1 | 2/2017 | Svensson et al. | |
| 2018/0118183 A1 | 5/2018 | Spieker | |

OTHER PUBLICATIONS

International Search Report and Written Opinion issued in correlated Application No. PCT/IB2019/052554, dated Jul. 30, 2019.

* cited by examiner

SYSTEMS AND METHODS FOR REDUCING ENERGY CONSUMPTION WITHIN A BRAKING SYSTEM OF A VEHICLE

FIELD

The present disclosure relates to braking systems for motor vehicles and, more particularly, to systems and methods for holding brake pressure while reducing energy consumption and minimizing heat buildup and noise, vibration, and harshness (NVH) effects associated with the braking system.

BACKGROUND

The statements in this section merely provide background information related to the present disclosure and may not constitute prior art.

In motor-driven piston-based braking systems, conditions exist whereby the motor and other electronics may heat up due to the magnitude of pressure and duration of a brake apply. These conditions typically occur when the brakes are holding the vehicle stationary for prolonged periods of time. In many systems, heat buildup may be addressed by applying an Electric Park Brake to hold the vehicle stationary. However, alternative or additional means of holding a vehicle stationary while minimizing heat buildup and/or NVH effects are desired.

SUMMARY

In one aspect, the present disclosure relates to a method for reducing energy consumption within a braking system of a vehicle. The method includes detecting an energy reduction condition associated with the braking system of the vehicle. A primary circuit apply valve and a secondary circuit apply valve of the braking system are energized in response to detecting the energy reduction condition. A motor of a slave cylinder of the braking system is de-energized in response to energizing the primary circuit apply valve and the secondary circuit apply valve. The primary circuit apply valve and the secondary circuit apply valve of the braking system are de-energized in response to de-energizing the motor of the slave cylinder.

In an aspect, the method further includes increasing a current supplied to the motor of the slave cylinder until a pressure value associated with brake calipers of respective wheels of the vehicle exceeds respective holding pressures associated with the primary circuit apply valve and the secondary circuit apply valve.

In another aspect, increasing the current supplied to the motor of the slave cylinder is performed in response to detecting a reduction in pressure applied to a brake pedal of the vehicle.

In yet another aspect, the respective holding pressures associated with the primary circuit apply valve and the secondary circuit apply valve are the same holding pressure.

In one aspect, the method further includes selectively energizing one or more electronic stability control (ESC) outlet valves of the braking system until a pressure value associated with brake calipers of wheels of the vehicle drops to approximately zero.

In another aspect, selectively energizing the one or more ESC outlet valves is performed in response to detecting a reduction in pressure applied to a brake pedal of the vehicle.

In one aspect, the primary circuit apply valve and the secondary circuit apply valve are configured to open in response to the pressure value associated with the brake calipers dropping to approximately zero.

In an aspect, the method further includes maintaining energization of a primary circuit master check valve and a secondary circuit master check valve of the braking system of the vehicle following de-energization of the primary circuit apply valve and the secondary circuit apply valve.

In yet another aspect, energizing the primary circuit apply valve and the secondary circuit apply valve prevents fluid communication from brake calipers of respective wheels of the vehicle to the slave cylinder.

In still another aspect, detecting the energy reduction condition is based on at least one of a magnitude of brake pressure and/or duration of brake apply.

In an aspect, the method further includes maintaining a pressure value associated with brake calipers of respective wheels of the vehicle in response to de-energizing the primary circuit apply valve and the secondary circuit apply valve.

In one aspect, maintaining the pressure value includes at least one of: (i) periodically re-applying pressure to the brake calipers; (ii) re-applying pressure to the brake calipers in response to detecting that at least one wheel has moved; and/or (iii) monitoring the pressure values associated with the brake calipers and re-applying pressure to the brake calipers in response to detecting a drop in the pressure value associated with the brake calipers.

According to another aspect of the present disclosure, another method for reducing energy consumption within a braking system of a vehicle is provided. The method includes detecting an energy reduction condition associated with the braking system of the vehicle. A pressure value associated with brake calipers of wheels of the vehicle is increased until the pressure value exceeds a different pressure value associated with a master cylinder of the braking system in response to detecting the energy reduction condition. A primary circuit apply valve and a secondary circuit apply valve of the braking system are energized in response to increasing the pressure value associated with the brake calipers. A motor of a slave cylinder of the braking system is de-energized in response to energizing the primary circuit apply valve and the secondary circuit apply valve. The primary circuit apply valve, the secondary circuit apply valve, a primary circuit master check valve, and a secondary circuit master check valve of the braking system are de-energized in response to de-energizing the motor of the slave cylinder.

In one aspect, the method further includes: (i) re-energizing the primary circuit master check valve and the secondary circuit master check valve; and (ii) increasing a current supplied to the motor of the slave cylinder until a pressure value associated with brake calipers of respective wheels of the vehicle exceeds respective holding pressures associated with the primary circuit apply valve and the secondary circuit apply valve.

In another aspect, increasing the current supplied to the motor of the slave cylinder is performed in response to detecting a reduction in pressure applied to a brake pedal of the vehicle.

In yet another aspect, the respective holding pressures are the same holding pressure.

In still another aspect, increasing the pressure value associated with the brake calipers includes increasing the pressure value to greater than 5 MPa above the different pressure value associated with the master cylinder.

In an aspect, detecting the energy reduction condition is based on at least one of a magnitude of brake pressure and duration of brake apply.

In one aspect, the method further includes maintaining the pressure value associated with the brake calipers in response to de-energizing the primary circuit apply valve, the secondary circuit apply valve, the primary circuit master check valve, and the secondary circuit master check valve.

In an aspect of the present disclosure, a system for reducing energy consumption within a braking system of a vehicle is provided. The system includes an energy reduction condition detection module, an apply valve control module, and a slave cylinder control module. The energy reduction condition detection module is configured to detect an energy reduction condition associated with the braking system of a vehicle. The apply valve control module is configured to energize a primary circuit apply valve and a secondary circuit apply valve of the braking system in response to the energy reduction condition detection module detecting the energy reduction condition. The slave cylinder control module is configured to de-energize a motor of a slave cylinder of the braking system in response to the apply valve control module energizing the primary circuit apply valve and the secondary circuit apply valve. Finally, the apply valve control module is further configured to de-energize the primary circuit apply valve and the secondary circuit apply valve of the braking system in response to the slave cylinder control module de-energizing the motor of the slave cylinder.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Corresponding reference numerals indicate corresponding parts throughout the several views of the drawings.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
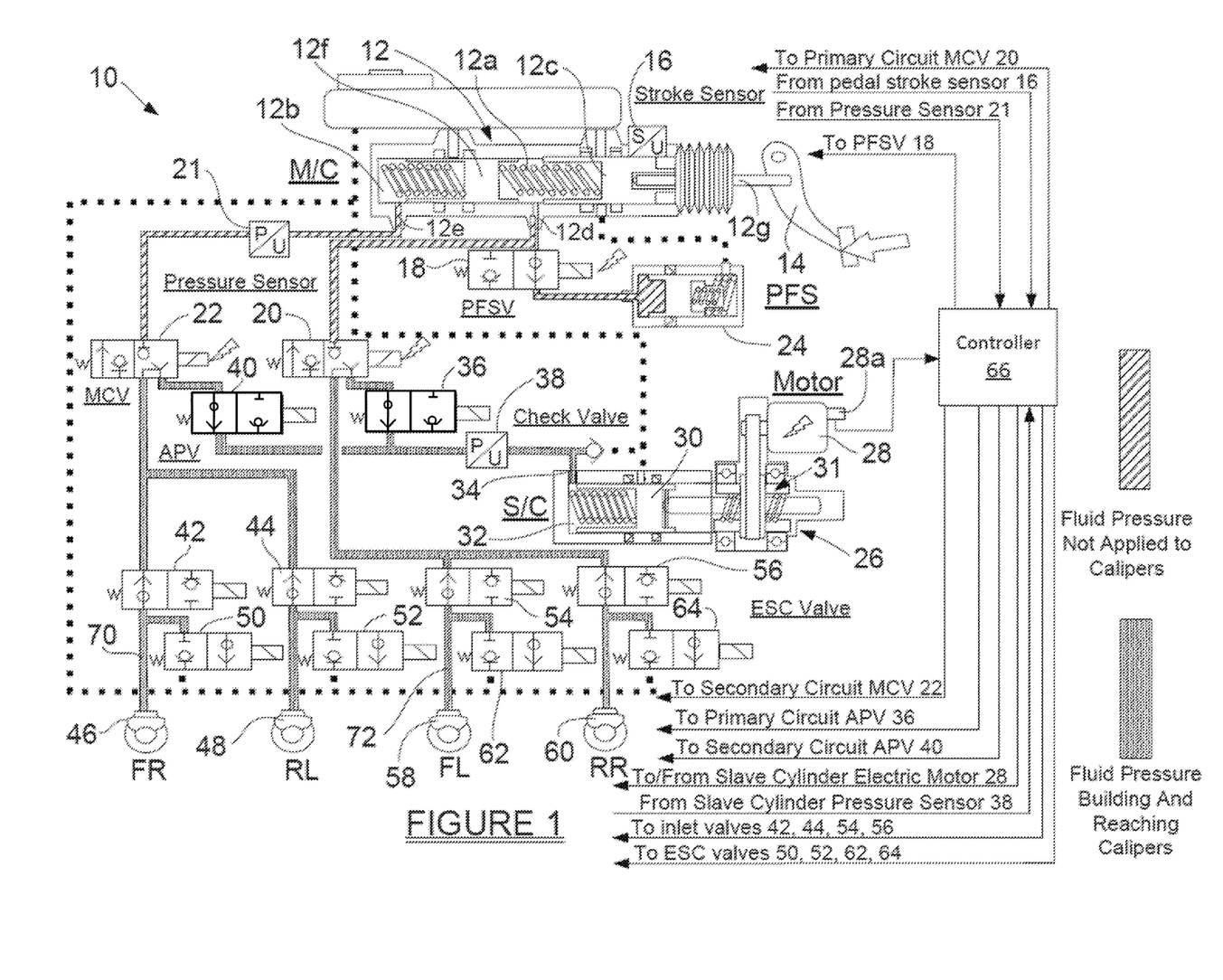
FIG. 1 is a high level schematic diagram of a braking system operating in a normal mode, in accordance with one embodiment of the present disclosure.

Referring to FIG. 1, there is shown a high level schematic diagram of a braking system 10 in accordance with one embodiment of the present disclosure. The braking system 10 includes a master cylinder 12 which receives a mechanical input signal from an input device, for example, a brake pedal 14, where the brake pedal 14 is configured to be operated (i.e., depressed) by an operator of the vehicle. A direct apply component position sensor 16, which in one example may be a stroke sensor (and will be referred to throughout for convenience simply as "stroke sensor 16") is used to sense a stroke (i.e., position) of the brake pedal 14, or of a stroke of an input rod or even a stroke of a piston of the master cylinder 12. The master cylinder 12 includes a primary circuit portion 12a having a primary piston 12c, and a secondary circuit portion 12b having a secondary piston 12f. The primary circuit portion 12a includes a first output port 12d in communication with both a pedal feel simulator valve 18 (hereinafter simply "PFSV 18") as well as a primary circuit master cut valve 20 (MCV). The secondary circuit portion 12b is in communication with a secondary circuit MCV 22 via a second output port 12e. In this example a pressure sensor 21 is coupled in line between the secondary circuit portion 12b of the master cylinder 12 and the secondary circuit MCV 22. However, it will be appreciated that the pressure sensor 21 could be in line with the primary circuit portion 12a, or there could be a sensor on each of the primary and secondary circuit portions 12a and 12b. The precise configuration and number of sensors used will depend in part on exactly how the leak detection is to be implemented. The PFSV 18 is in communication with a pedal feel simulator component 24, which is in turn in communication with the primary circuit portion 12a of the master cylinder 12.

Referring further to FIG. 1, the braking system 10 further includes a slave cylinder 26 having a motor 28. The slave cylinder motor 28 controls linear movement of a piston 30 via a ball screw assembly 31, which in turn forces brake fluid out from a fluid chamber 32, through an outlet port 34 to a port of a primary circuit apply valve 36 (APV). It will be appreciated that with this implementation that makes use of the motor 28, an isolated apply component position sensor 28a is used for monitoring a position (i.e., travel) of an isolated apply component. The isolated apply component position sensor 28a, in one example, may be an encoder which is used to monitor the rotational position of the motor 28 for use in determining the control of final pressure, motor control and slave cylinder 26 piston travel for leak detection. For convenience, the isolated apply position sensor 28a will be referred throughout the following discussion simply as the "encoder 28a". It should also be noted that alternative methods for measuring/monitoring the slave cylinder piston travel can also be used, as well as alternative structures for forcing brake fluid in isolation from the master cylinder 12 along with corresponding methods of measuring/monitoring travel of components forcing the brake fluid. For example, the encoder 28a could be used on the motor 28 or on the ball screw assembly 31, or any other suitable sensing element may be used that is able to sense movement of components forcing the brake fluid such as the slave cylinder piston 30.

The primary circuit APV 36 is also coupled for communication with a port of the primary circuit MCV 20. A pressure sensor 38 is coupled in a fluid line coupling the slave cylinder outlet port 34 with the primary circuit APV 36. The outlet port 34 of the slave cylinder 26 is also coupled to a port of a secondary circuit APV 40. The primary circuit MCV 20 and the primary circuit APV 36 essentially form a first valve subsystem associated with the primary circuit. The secondary circuit MCV 22 and the secondary circuit APV 40 essentially form a second valve subsystem associated with the secondary circuit.

Referring further to FIG. 1, a port of the secondary circuit MCV 22 is in communication with secondary circuit inlet valves 42 and 44. Secondary circuit inlet valves 42 and 44 are in communication with a front/right (FR) brake caliper 46 and a rear/left (RL) brake caliper 48, respectively. The secondary circuit inlet valves 42 and 44 are also in communication with secondary circuit electronic stability control valves 50 and 52 (ESC valves), respectively. The primary circuit MCV 20 is in communication with primary circuit inlet valves 54 and 56. Primary circuit inlet valves 54 and 56 are in communication with the front/left (FL) brake caliper 58 and the rear/right (RR) brake caliper 60, respectively. The primary circuit inlet valves 54 and 56 are also in communication with primary circuit ESC valves 62 and 64, respectively. The primary circuit portion 12a of the master cylinder 12, the primary circuit MCV 20, the primary circuit APV 36, the slave cylinder 26, pressure sensor 38, primary circuit inlet valves 54 and 56, primary circuit ESC valves 62 and 64, and brake calipers 58 and 60 are included within the primary circuit of the braking system 10. The secondary circuit portion 12b of the master cylinder 12, the secondary circuit MCV 22, the secondary circuit APV 40, the pressure sensor 21, the secondary circuit inlet valves 42 and 44, the secondary ESC valves 50 and 52, and the FR and RL brake calipers 46 and 48, are included within the secondary circuit.

It will be appreciated that a portion of the braking system 10 forms a "direct apply" subsystem, and a portion forms an "isolated apply" subsystem." The isolated apply subsystem may be formed by the slave cylinder 26 having the slave cylinder motor 28 and a ball screw assembly 31. The ball screw assembly 31 drives the piston 30, which may be viewed as an "isolated apply component". The isolated apply subsystem may have a single output in communication with the primary circuit APV 36 and the secondary circuit APV 40. The direct apply subsystem may include the dual output master cylinder 12, which is mechanically coupled to and actuated by the brake pedal 14, and builds fluid pressure in at least one of the PFS 24, the primary circuit, and the secondary circuit in direct relation to actuation of the brake pedal. A piston 12c and/or a piston 12f, and/or the input rod 12g, and/or the brake pedal 14, may be viewed as a "direct apply component". A first output 12d of the direct apply subsystem (i.e., master cylinder 12) may be in communication with the PFSV 18 and the primary circuit MCV 20. A second output 12e of the master cylinder 12 may be in communication with the secondary circuit MCV 22. It will also be appreciated that the isolated supply system could be formed by any assembly, such as using a motor driven pump with an accumulator and a spool valve, that can provide boosted fluid pressure through a single outlet 34 to one or both of the primary circuit and the secondary circuit responsive to a sensed stroke of the brake pedal 14 while being mechanically isolated from the brake pedal.

With further reference to FIG. 1, a processor-based controller 66 is shown in highly simplified form. The controller 66 receives signals from the pressure sensors 21 and 38, and from the stroke sensor 16. The controller 66 generates signals for controlling the PFSV 18, the slave cylinder motor 28 and the various valves 20, 22, 36, 40, 42, 44, 50, 52, 54, 56, 62 and 64.

As discussed below and with further regard to FIG. 7 herein, the controller 66 may be configured to control operations of components of the braking system 10 to transition the system 10 between, for example, (i) a normal operating mode, (ii) a low energy/low heat/low NVH effect mode, and (iii) a super low energy/super low heat/super low NVH effect mode. In the low energy/low heat/low NVH effect mode, energy consumption, heat, and NVH effects may be reduced compared to the normal operating mode. In the super low energy/super low heat/super low NVH effect mode, energy consumption, heat, and NVH effects may be reduced compared to the low energy/low heat/low NVH effect mode operating mode. Transitioning between the various modes may be accomplished by the controller 66 as follows.

As noted above, FIG. 1 reflects the braking system 10 in normal mode. In this normal mode, the PFSV 18, primary circuit MCV 20, secondary circuit MCV 22, and slave cylinder motor 28 are all energized. Accordingly, in this mode, there is current draw and associated heat buildup that are functions of the required pressure. However, under certain conditions (e.g., when the vehicle is stopped), it may be desirable to reduce the pressure/current to limit the heat buildup and/or NVH effects (e.g., excessive noise and/or vibration associated with the pressure/current buildup). This reduction may be accomplished as follows.

Figure 2:
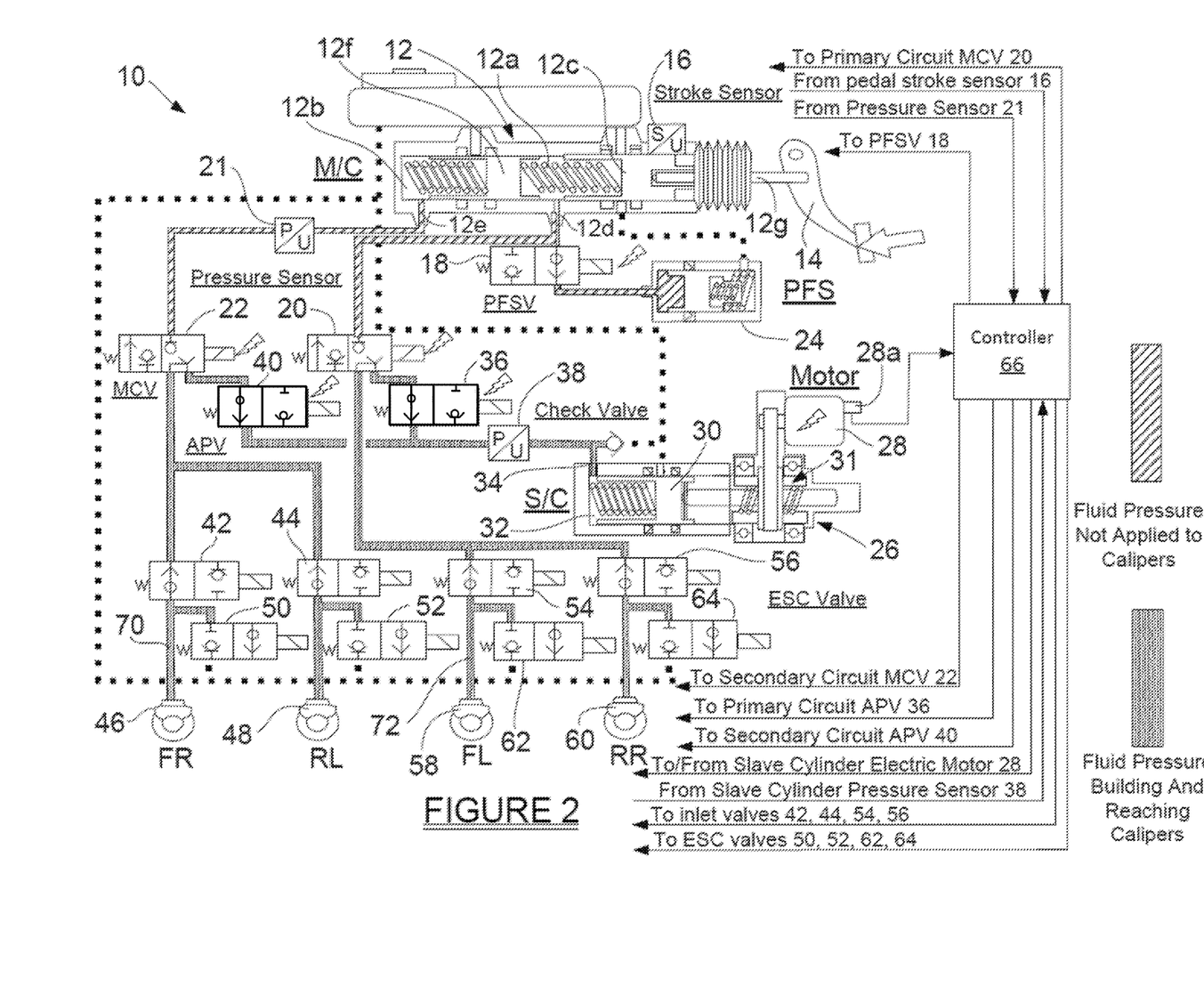
FIG. 2 is an illustration of the braking system of FIG. 1 after the apply valves have been energized.

Beginning with FIG. 2, various methods for transitioning the braking system 10 into (and out of) low energy/low heat/low NVH effect, and super low energy/super low heat/super low NVH effect, modes are illustrated. According to certain examples, the controller 66 may initiate transition from a normal operating mode to the low energy/low heat/low NVH effect mode or super low energy/super low heat/super low NVH effect mode based on the detection of an energy reduction condition associated with the system 10. As used herein, "detecting an energy reduction condition" may include identifying an energy reduction condition (e.g., automatically based upon the existence of certain conditions) and/or defining (e.g., manually, as desired by, for example, an operator of the vehicle) an energy reduction condition. In one example, the controller 66 may detect an energy reduction condition based on a magnitude of brake pressure (e.g., the force with which an operator depresses the brake pedal 14) and/or a duration of brake apply (e.g., the length of time that the brake pedal 14 remains depressed). According to some examples, the magnitude of brake pressure and/or the duration of brake apply may be gleaned from the stroke sensor 16 and/or any other suitable sensors of the system 10.

According to one example, transition into and out of the low energy/low heat/low NVH effect mode may be accomplished as follows. First, as illustrated in FIG. 2, the primary circuit APV 36 and the secondary circuit APV 40 may be energized (as indicated in FIG. 2 by the addition of the lightning bolt symbols next to the APVs 36, 40). Energization of the primary circuit APV 36 and the secondary circuit APV 40 serves to prevent fluid flow/communication from the brake calipers 46, 48, 58, 60 to the slave cylinder 26. For example, energization of the primary circuit APV 36 and the secondary circuit APV 40 may cause the APVs 36, 40 to close.

Figure 3:
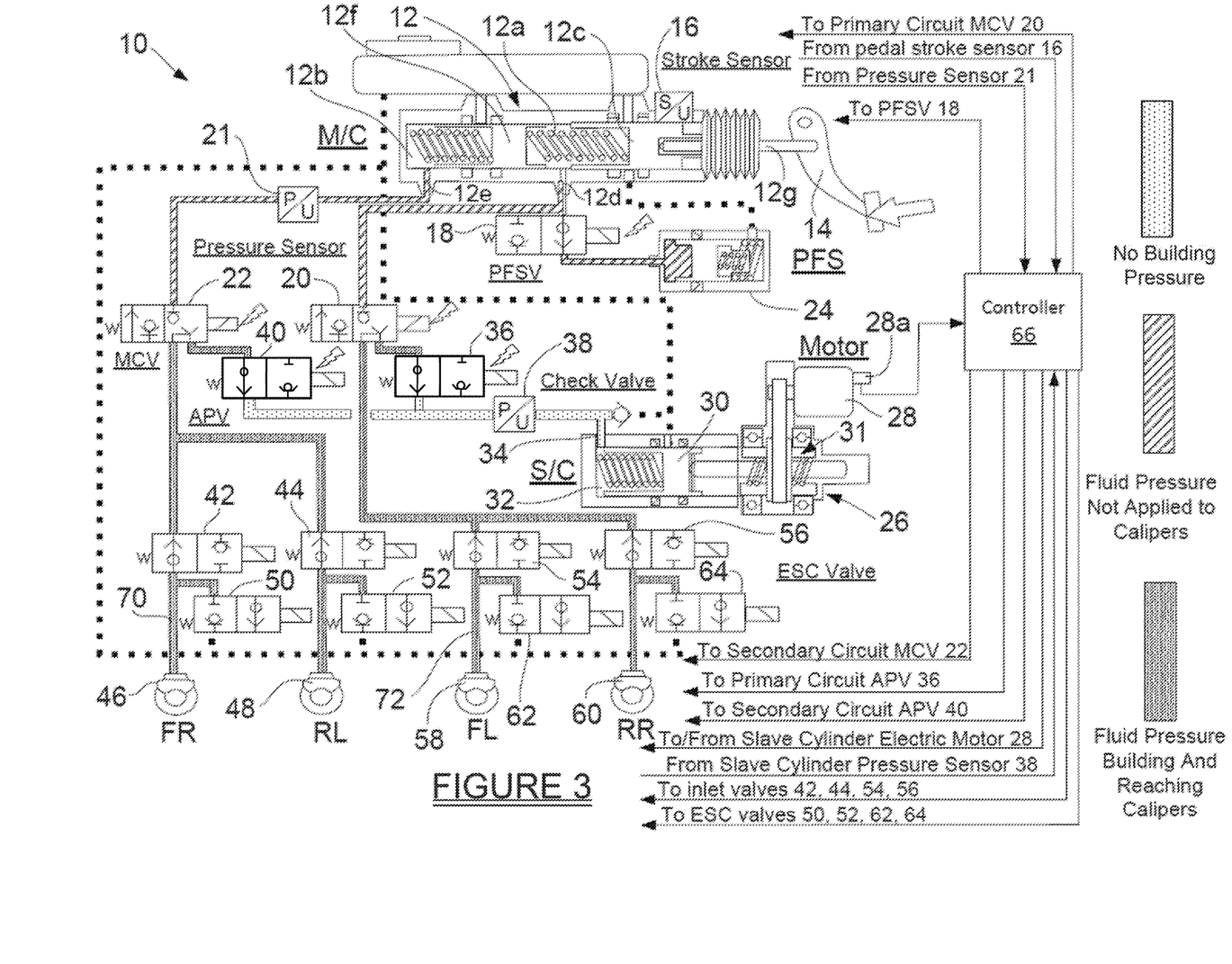
FIG. 3 is an illustration of the braking system of FIG. 2 after the motor of the slave cylinder has been de-energized.

Moving to FIG. 3, the slave cylinder motor 28 may be de-energized (as indicated in FIG. 3 by the removal of the lightning bolt symbol from the motor 28). Following de-energization of the slave cylinder motor 28, the APVs 36, 40 will maintain pressure in the brake calipers 46, 48, 58, 60.

Figure 4:
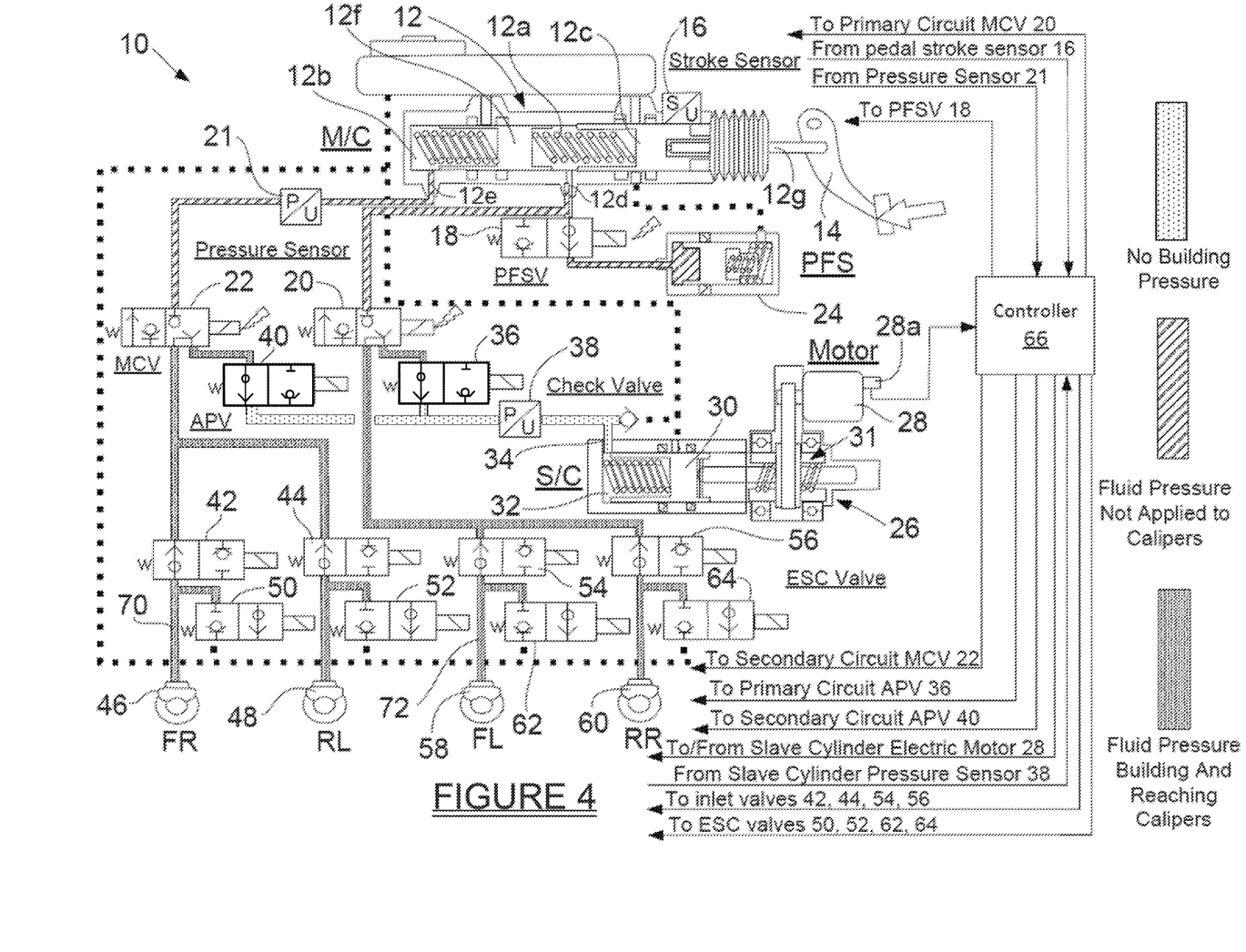
FIG. 4 is an illustration of the braking system of FIG. 3 after the apply valves have been de-energized.

Moving to FIG. 4, the APVs 36, 40 may be de-energized (as indicated in FIG. 4 by the removal of the lightning bolt symbols from the APVs 36, 40). In this state, the design/configuration of the APVs 36, 40 will hold the pressure in the brake calipers 46, 48, 58, 60. In this manner, the system 10 may be transitioned from a normal operating mode to a low energy/low heat/low NVH effect mode, whereby reductions in energy consumption, heat, and NVH effects are achieved by, among other things, reducing and/or eliminating current drawn by the APVs 36, 40 and slave cylinder motor 28. In addition, as illustrated in FIG. 4, according to one example of the low energy/low heat/low NVH effect mode described herein, energization of the primary circuit MCV 20 and the secondary circuit MCV 22 may be maintained following de-energization of the primary circuit APV 36 and the secondary circuit APV 40. Stated differently, according to this example, energization of the primary circuit MCV 20 and the secondary circuit MCV 22 may be maintained while the system 10 operates in the low energy/low heat/low NVH effect mode. In this manner, while operating in the low energy/low heat/low NVH effect mode, current draw for the system 10 may be reduced to only the current drawn by the MCVs 20, 22, which may be approximately 1.5 amps in some examples. According to some examples, the coils of the MCVs (which may be solenoid-based MCVs) and driver circuitry may be configured to maintain the mode illustrated in FIG. 4 indefinitely.

According to some examples, it may be desirable or necessary to maintain a constant pressure value (e.g., an average pressure value) in the brake calipers 46, 48, 58, 60 while the system 10 is in the state shown in FIG. 4. This may be achieved in a variety of way including, but not limited to: (i) periodically re-applying pressure over a period of time (e.g., at periodic, predefined intervals) to the brake calipers 46, 48, 58, 60 to maintain the pressure value in the brake calipers; (ii) re-applying pressure to the brake calipers 46, 48, 58, 60 in response to detecting that at least one of the wheels of the vehicle has moved (e.g., as detected by one or more wheel speed sensors (not shown), or any other suitable means for detecting wheel movement known in the art); and/or (iii) monitoring the pressure values associated with the brake calipers 46, 48, 58, 60 and re-applying pressure to the brake calipers 46, 48, 58, 60 in response to detecting a drop in the pressure value associated with the brake calipers 46, 48, 58, 60 (which pressure drop may be detected by various suitable sensors or the like).

The system 10 may be transitioned back from the low energy/low heat/low NVH effect mode to the normal mode (illustrated in FIG. 1) in response to various conditions. According to one example, the system 10 may transition from the low energy/low heat/low NVH effect mode to the normal mode in response to detecting a reduction in pressure applied to the brake pedal 14 of the vehicle. This may signify, for example, that the operator of the vehicle no longer wishes for the vehicle to maintain stationary. Of course, other suitable stimuli for transitioning from a low energy/low heat/low NVH effect mode to a normal operating mode may be equally employed without deviating from the teachings herein.

In one example, the system 10 may transition from the low energy/low heat/low NVH effect mode to the normal operating mode by increasing a current supplied to the slave cylinder motor 28 until a pressure value associated with the brake calipers 46, 48, 58, 60 of respective wheels of the vehicle exceeds respective holding pressures associated with the primary circuit APV 36 and the secondary circuit APV 40. This transition is illustrated with regard to FIG. 1, where the motor 28 is shown as energized once again (as indicated in FIG. 1 by the inclusion of the lightning bolt symbol on the motor 28). As used herein, a "holding pressure" constitutes a maximum pressure that a closed valve may maintain before it is forced open. Stated differently, once the pressure imposed on a valve exceeds its holding pressure, the valve will open. According to one example, the primary circuit APV 36 and the secondary circuit APV 40 have the same holding pressure. According to another example, the primary circuit APV 36 and the secondary circuit APV 40 have different holding pressures. In any event, according to this transition technique, the increased pressure created by slave cylinder motor 28 within the isolated apply subsystem may exceed the holding pressures of the APVs 36, 40, causing the APVs 36, 40 to "pop" open thereby returning the system 10 to its normal operating mode.

Figure 5:
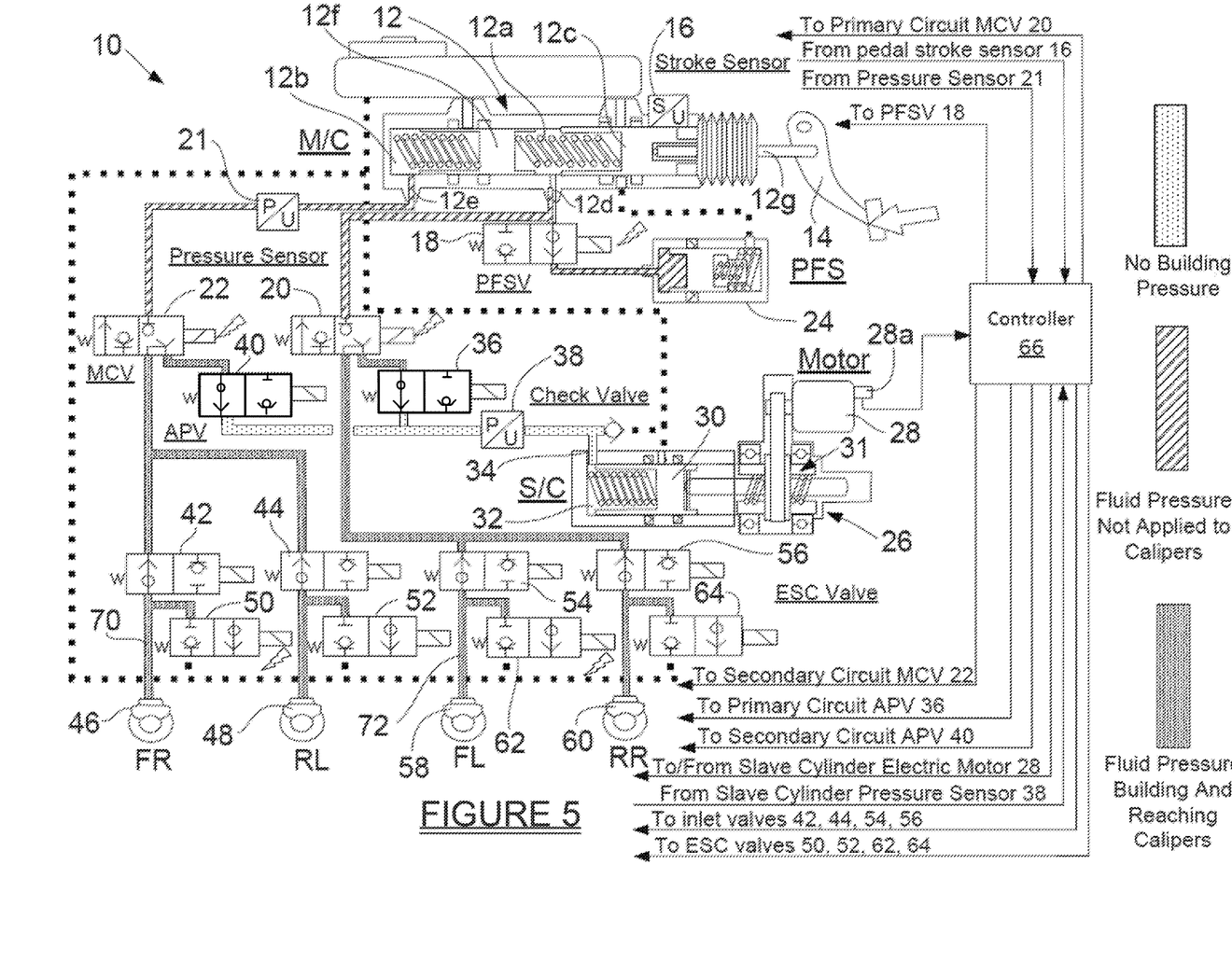
FIG. 5 is an illustration of the braking system of FIG. 3 after ESC outlet valves have been selectively energized.

In another example, the system 10 may be transitioned from the low energy/low heat/low NVH effect mode to the normal operating mode by selectively energizing one or more of the ESC outlet valves 50, 52, 62, 64 until a pressure value associated with the brake calipers 46, 48, 58, 60 of respective wheels of the vehicle drops to approximately zero. According to some examples, the APVs 36, 40 are configured to open in response to the pressure value associated with the brake calipers 46, 48, 58, 60 dropping to approximately zero. This transition is illustrated with regard to FIG. 5, where the secondary circuit outlet ESC valve 50 and primary circuit outlet ESC valve 62 are shown as being energized (as indicated in FIG. 5 by the addition of the lightning bolt symbols next to the ESC valves 50, 62). According to one example of this transition technique, the MCVs 20, 22 must be energized (as shown in FIG. 5) and feedforward control of the ESC outlet valves 50, 52, 62, 64 must be enabled to reduce pressure within the system 10. While FIG. 5 illustrates valves 50 and 62 being energized, according to certain examples, other combinations of one or more of the ESC outlet valves 50, 52, 62, 64 may be energized to accomplish the transition described herein.

According to one example, transition into and out of the super low energy/super low heat/super low NVH effect mode may be accomplished as follows. First, beginning with the energization states of system components reflected in FIG. 1, an energy reduction condition associated with the system 10 may be detected in accordance with the energy reduction condition detection techniques described above. Upon detection of an energy reduction condition, a pressure value associated with the brake calipers 46, 48, 58, 60 of the wheels of the vehicle may be increased until the pressure value exceeds a different pressure value associated with the master cylinder 12 of the system 10. According to one example, the pressure value associated with the brake calipers 46, 48, 58, 60 may be increased by controlling (e.g., increasing) current supplied to the slave cylinder motor 28. However, other suitable means for increasing the pressure value associated with the brake calipers 46, 48, 58, 60 may be equally employed without deviating from the teachings of the present disclosure. Furthermore, according to some examples, increasing the pressure value associated with the brake calipers 46, 48, 58, 60 may include increasing the pressure value to 5 MPa above than the pressure value associated with the master cylinder 12. Those having ordinary skill will appreciate, however, that the 5 MPa value is but an example. According to some examples, increasing the pressure value associated with the brake calipers 46, 48, 58, 60 may include increasing the pressure value to any value that exceeds a differential pressure associated with the master cylinder 12. According to other examples, increasing the pressure value associated with the brake calipers 46, 48, 58, 60 may include increasing the pressure value to exceed the holding pressure associated with the MCVs 20, 22.

Next, as illustrated in FIG. 2, the primary circuit APV 36 and the secondary circuit APV 40 may be energized (as indicated in FIG. 2 by the addition of the lightning bolt symbols next to the APVs 36, 40). As discussed above, energization of the primary circuit APV 36 and the secondary circuit APV 40 serves to prevent fluid flow/communication from the brake calipers 46, 48, 58, 60 to the slave cylinder 26. For example, energization of the primary circuit APV 36 and the secondary circuit APV 40 may cause the APVs 36, 40 to close.

Following energization of the primary circuit APV 36 and the secondary circuit APV 40, and as illustrated in FIG. 3, the slave cylinder motor 28 may be de-energized (as indicated in FIG. 3 by the removal of the lightning bolt symbol from the motor 28). Following de-energization of the slave cylinder motor 28, the APVs 36, 40 will maintain pressure in the brake calipers 46, 48, 58, 60.

Figure 6:
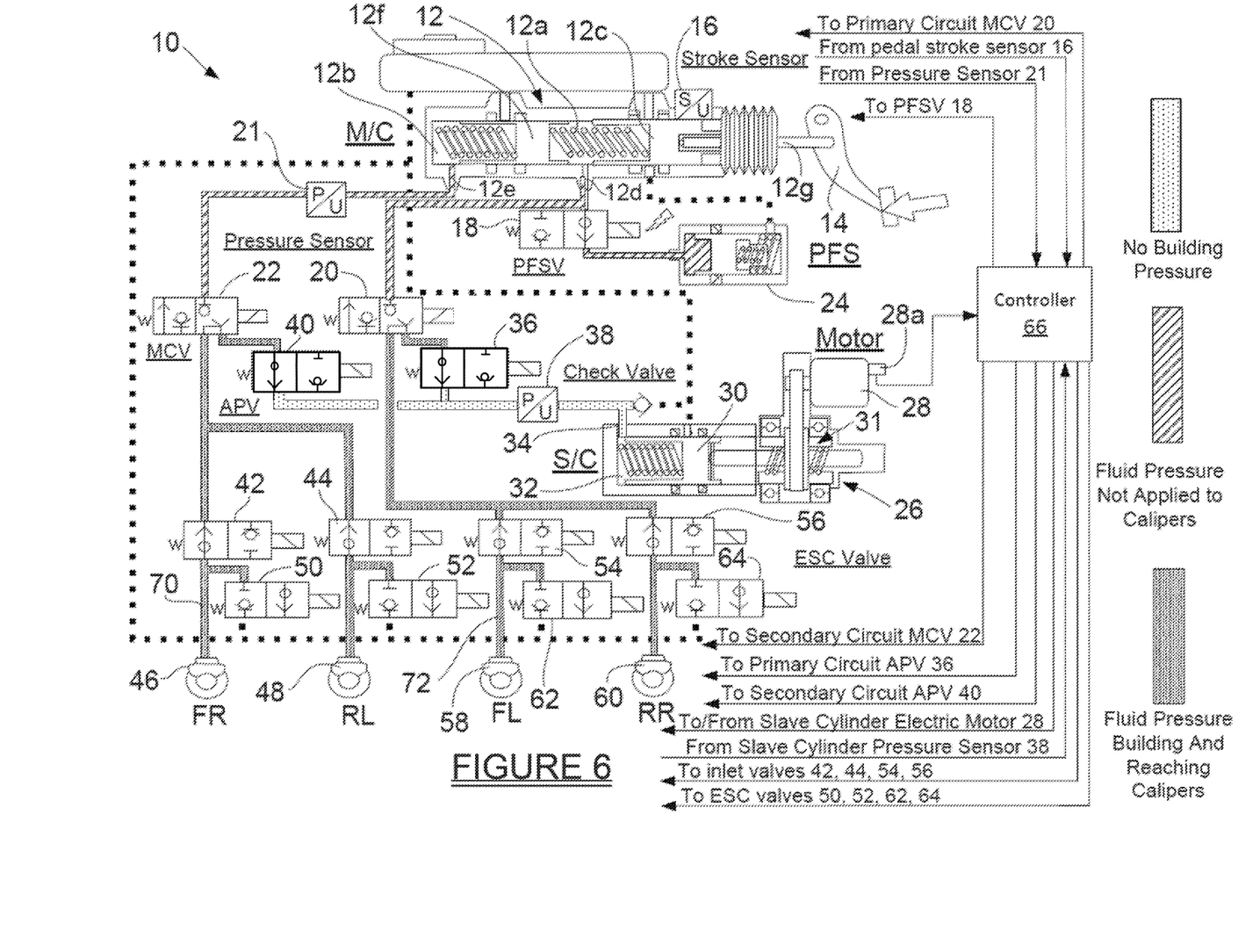
FIG. 6 is an illustration of the braking system of FIG. 3 after the apply valves and master check valves have been de-energized.

With reference now to FIG. 6, the APVs 36, 40 and the MCVs 20, 22 may be de-energized (as indicated in FIG. 6 by the removal of the lightning bolt symbols from the APVs 36, 40 and MCVs 20, 22). In this state, the design/configuration of the APVs 36, 40 and MCVs 20, 22 will hold the pressure in the brake calipers 46, 48, 58, 60. In this manner, the system 10 may be transitioned from a normal operating mode to a super low energy/super low heat/super low NVH effect mode, whereby reductions in energy consumption, heat, and NVH effects are achieved by, among other things, reducing and/or eliminating current drawn by the APVs 36, 40, slave cylinder motor 28, and MCVs 20, 22.

According to some examples, it may be desirable or necessary to maintain a constant pressure value (e.g., an average pressure value) in the brake calipers 46, 48, 58, 60 while the system 10 is in the state shown in FIG. 6. This may be achieved in a variety of ways including, but not limited to: (i) periodically re-applying pressure over a period of time (e.g., at periodic, predefined intervals) to the brake calipers 46, 48, 58, 60 to maintain the pressure value in the brake calipers; (ii) re-applying pressure to the brake calipers 46, 48, 58, 60 in response to detecting that at least one of the wheels of the vehicle has moved (e.g., as detected by one or more wheel speed sensors (not shown), or any other suitable means for detecting wheel movement known in the art); and/or (iii) monitoring the pressure values associated with the brake calipers 46, 48, 58, 60 and re-applying pressure to the brake calipers 46, 48, 58, 60 in response to detecting a drop in the pressure value associated with the brake calipers 46, 48, 58, 60 (which pressure drop may be detected by various suitable sensors or the like).

As with the low energy/low heat/low NVH effect mode, the system 10 may be transitioned back from the super low energy/super low heat/super low NVH effect mode to the normal mode (illustrated in FIG. 1) in response to various conditions. According to one example, the system 10 may transition from the super low energy/super low heat/super low NVH effect mode to the normal mode in response to detecting a reduction in pressure applied to the brake pedal 14 of the vehicle. This may signify, for example, that the operator of the vehicle no longer wishes for the vehicle to maintain stationary. Of course, other suitable stimuli for transitioning from a super low energy/super low heat/super low NVH effect mode to a normal operating mode may be equally employed without deviating from the teachings herein.

The system 10 may transition from the super low energy/super low heat/super low NVH effect mode to the normal operating mode by re-energizing the MCVs 20, 22 and increasing a current supplied to the slave cylinder motor 28 until a pressure value associated with the brake calipers 46, 48, 58, 60 of respective wheels of the vehicle exceeds respective holding pressures associated with the primary circuit APV 36 and the secondary circuit APV 40. As discussed above, the holding pressures associated with the primary circuit APV 36 and the secondary circuit APV 40 may be the same or different. In any event, this transition is illustrated with regard to FIG. 1, where the MCVs 20, 22 and motor 28 are shown as energized once again (as indicated in FIG. 1 by the inclusion of the lightning bolt symbols corresponding to the MCVs 20, 22 and the motor 28). According to this transition technique, the increased pressure created by slave cylinder motor 28 within the isolated apply subsystem may exceed the holding pressures of the APVs 36, 40, causing the APVs 36, 40 to "pop" open thereby returning the system 10 to its normal operating mode. According to some examples, the pressure demand may be reduced shortly after the pressure builds and may be noted by an increase in slave cylinder travel (e.g., as measured by the motor position of the slave cylinder 26).

Figure 7:
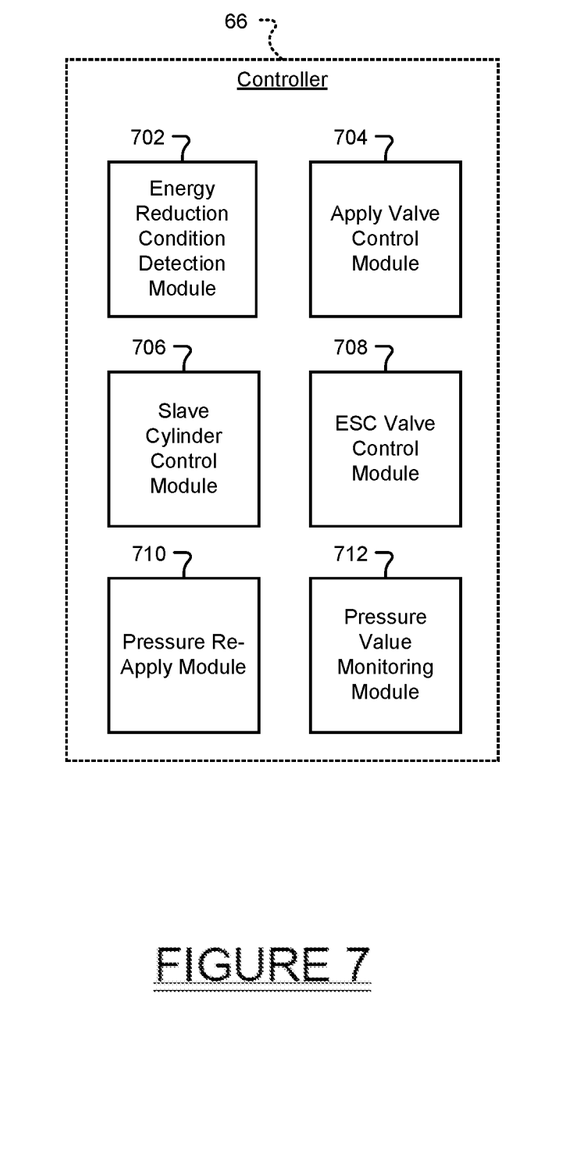
FIG. 7 is a functional block diagram of a controller configured to control aspects of the braking system of FIG. 1.

Turning now to FIG. 7, one example of the controller 66 described herein is illustrated. As discussed above, the controller 66 may be configured to control components of the system 10 so as to effectuate transitions between the various operating modes of the system 10 described herein. The controller 66 is shown as including a variety of modules. As used herein, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The controller 66 includes an energy reduction condition detection module 702, an apply valve control module 704, a slave cylinder control module 706, an ESC valve control module 708, a pressure re-apply module 710, and a pressure value monitoring module 712.

The energy reduction condition detection module 702 is configured to detect an energy reduction condition associated with the braking system 10 of a vehicle. Detection of an energy reduction condition may be accomplished via any suitable techniques, such as based on a magnitude of brake pressure and/or duration of brake apply, or via any other energy reduction condition detection techniques known in the art.

The apply valve control module 704 is configured to energize the primary circuit APV 36 and the secondary circuit APV 40 of the braking system 10 in response to the energy reduction condition detection module 702 detecting the energy reduction condition. Energization may be accomplished, for example, by facilitating the connection between an energy supply source (e.g., a battery or the like) and the APVs 36, 40. In addition, the apply valve control module 704 is configured to de-energize the APVs 36, 40, for example, by facilitating the removal of a connection between an energy supply source (e.g., a battery or the like) and the APVs 36, 40. According to one example, the apply valve control module 704 is configured to de-energize the APVs 36, 40 in response to the slave cylinder control module 706 de-energizing the motor 28 of the slave cylinder 26.

The slave cylinder control module 706 is configured to de-energize the motor 28 of the slave cylinder 26 of the braking system 10 in response to the apply valve control module 704 energizing the primary circuit APV 36 and the secondary circuit APV 40. In addition, according to some examples, the slave cylinder control module 706 is configured to energize (or re-energize, as the case may be), the motor 28 of the slave cylinder 26. In addition, in some examples, the slave cylinder control module 706 is configured to increase current supplied to the motor 28 of the slave cylinder 26 (e.g., until a pressure value associated with brake calipers 46, 48, 58, 60 exceeds respective holding pressures associated with the primary circuit APV 36 and the secondary circuit APV 40).

The ESC valve control module 708 is configured to selectively energize one or more of the ESC outlet valves 50, 52, 62, 64 of the braking system 10 (e.g., until a pressure value associated with brake calipers 46, 48, 58, 60 drops to approximately zero). Similarly, according to some examples, the ESC valve control module 708 is configured to de-energize one or more of the ESC outlet valves 50, 52, 62, 64 of the braking system 10.

The pressure re-apply module 710 is configured to re-apply pressure to the brake calipers 46, 48, 58, 60 to, for example, maintain the pressure value associated with brake calipers 46, 48, 58, 60 (e.g., the average pressure, pressure at a given point in time, etc.). The pressure re-apply module 710 is configured to re-apply pressure under a variety of conditions including, but not limited to, (i) periodically (e.g., at predetermined intervals), (ii) in response to detecting that at least one wheel of the vehicle has moved, and/or (iii) in response to detecting a drop in the pressure value associated with the brake calipers 46, 48, 58, 60 (e.g., based on monitoring of the pressure value associated with the brake calipers 46, 48, 58, 60). According to some examples, the pressure re-apply module 710 is configured to re-apply the pressure by controlling the motor 28 of the slave cylinder 26.

The pressure value monitoring module 712 is configured to monitor the pressure value associated with the brake calipers 46, 48, 58, 60. The pressure value monitoring module 712 may monitor the pressure value associated with the brake calipers 46, 48, 58, 60 based on sensor readings or the like.

Figure 8:
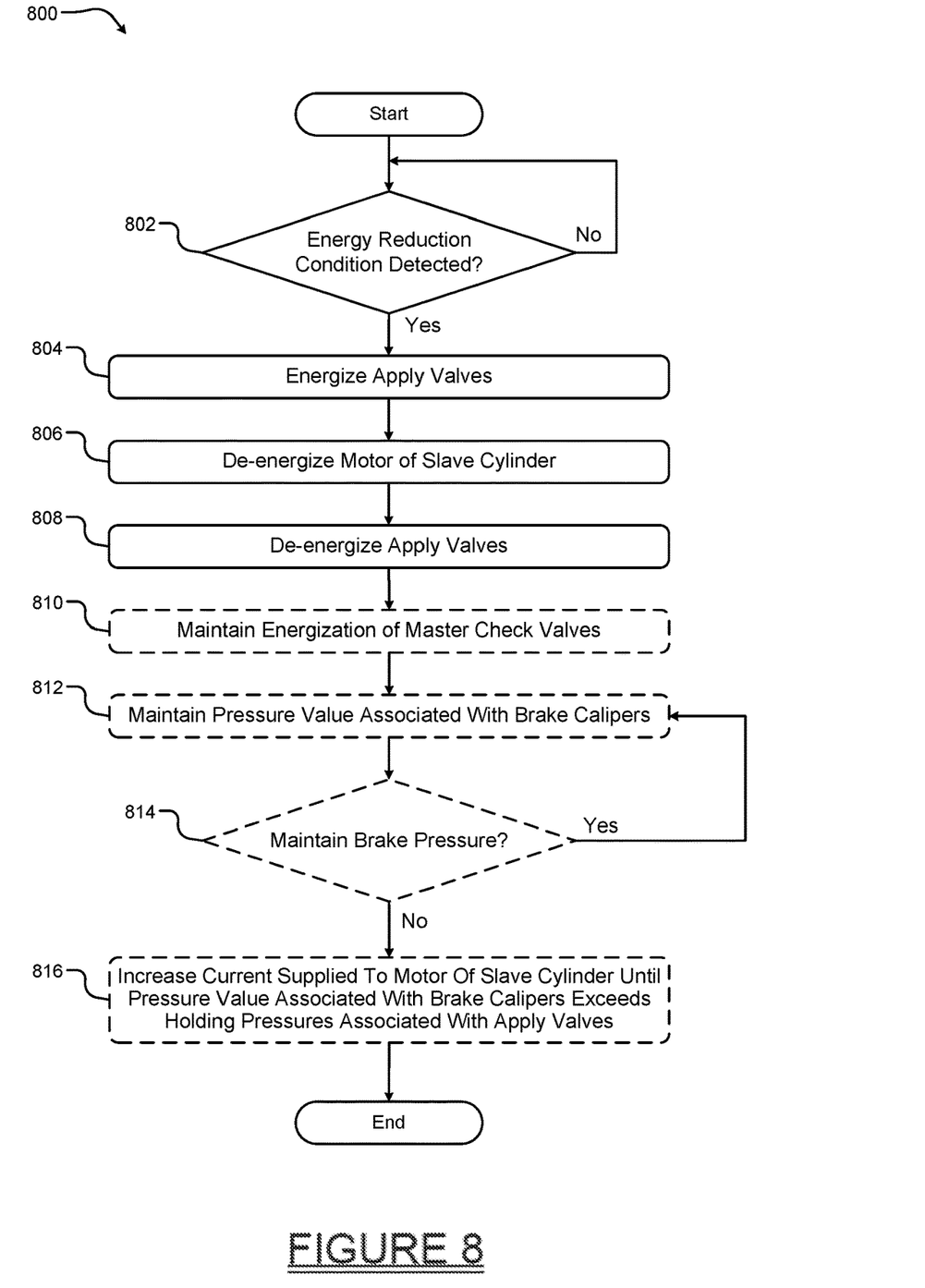
FIG. 8 is a flowchart illustrating a method for reducing energy consumption within a braking system according to one aspect of the present disclosure.

Turning now to FIG. 8, a flowchart illustrating a method 800 for preventing overheating within a braking system of a vehicle is provided. The method 800 starts at 802 where a determination is made as to whether an energy reduction condition associated with the braking system of the vehicle has been detected. If not, the method 800 re-starts. If an energy reduction condition has been detected, the method 800 proceeds to 804 where a primary circuit apply valve and a secondary circuit apply valve of the braking system are energized in response to detecting the overheat condition. At 806, a motor of a slave cylinder of the braking system is de-energized in response to energizing the primary circuit apply valve and the secondary circuit apply valve. At 808, the primary circuit apply valve and the secondary circuit apply valve of the braking system are de-energized in response to de-energizing the motor of the slave cylinder.

According to some examples, the method 800 concludes after 808. However, in other examples, the method 800 proceeds to one or more of optional steps 810, 812, 814, and/or 816. At optional step 810, energization of a primary circuit master check valve and a secondary circuit master check valve of the braking system of the vehicle is maintained following de-energization of the primary circuit apply valve and the secondary circuit apply valve. At optional step 812, a pressure value associated with brake calipers of respective wheels of the vehicle is maintained in response to de-energizing the primary circuit apply valve and the secondary circuit apply valve. At 814, a determination is made as to whether the brake pressure should be maintained. If so, the method 800 returns to step 812 and the pressure value is maintained. If not, the method 800 proceeds to 816. Finally, at optional step 816, a current supplied to the motor of the slave cylinder is increased until a pressure value associated with brake calipers of respective wheels of the vehicle exceeds respective holding pressures associated with the primary circuit apply valve and the secondary circuit apply valve. Following any of optional steps 810, 812, 814, and/or 816 the method 800 concludes.

Figure 9:
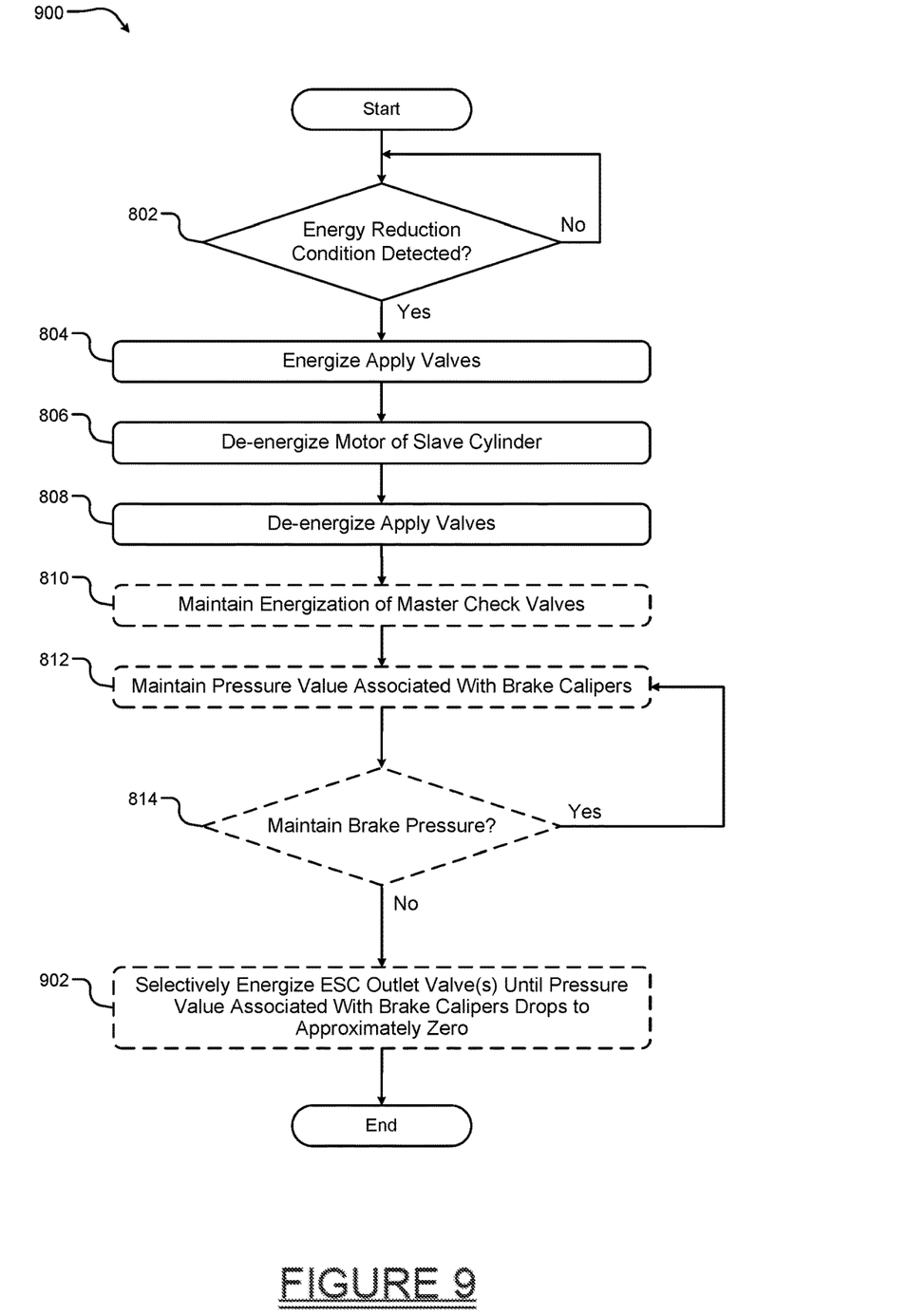
FIG. 9 is a flowchart illustrating a method for reducing energy consumption within a braking system according to another aspect of the present disclosure.

FIG. 9 is a flowchart illustrating another method 900 for preventing overheating within a braking system of a vehicle. Steps 802 through 814 are carried out in accordance with the descriptions of those steps provided above with regard to FIG. 8. However, the method 900 replaces optional step 816 of FIG. 8 with optional step 902. Optional step 902 reflects an alternative way to transition the braking system back from a low energy/low heat/low NVH effect mode to a normal operating mode. At 902, one or more electronic stability control (ESC) outlet valves of the braking system are selectively energized until a pressure value associated with brake calipers of wheels of the vehicle drops to approximately zero. Following any of optional steps 810, 812, 814 and/or 902, the method 900 concludes.

Figure 10:
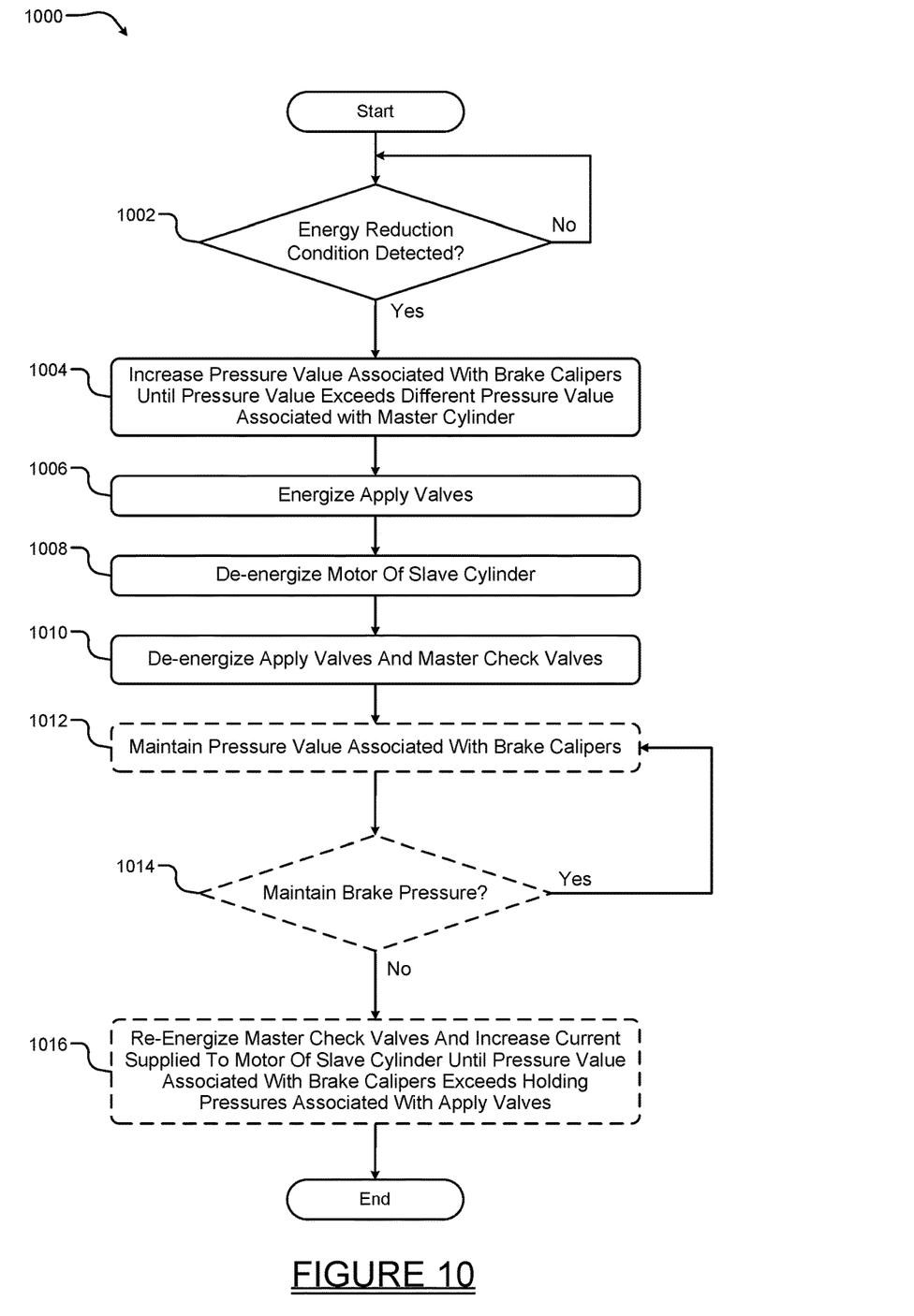
FIG. 10 is a flowchart illustrating a method for reducing energy consumption within a braking system according to still another aspect of the present disclosure.

FIG. 10 is a flowchart illustrating yet another method 1000 for preventing overheating within a braking system of a vehicle. The method 1000 starts at 1002 where a determination is made as to whether an energy reduction condition associated with the braking system of the vehicle has been detected. If not, the method 1000 re-starts. If an energy reduction condition has been detected, the method 1000 proceeds to 1004 where a pressure value associated with brake calipers of wheels of the vehicle is increased until the pressure value exceeds a different pressure value associated with a master cylinder of the braking system in response to detecting the overheat condition. At 1006, a primary circuit apply valve and a secondary circuit apply valve of the braking system are energized in response to increasing the pressure value associated with the brake calipers. At 1008, a motor of a slave cylinder of the braking system is de-energized in response to energizing the primary circuit apply valve and the secondary circuit apply valve. At 1010, the primary circuit apply valve, the secondary circuit apply valve, a primary circuit master check valve, and a secondary circuit master check valve of the braking system are de-energized in response to de-energizing the motor of the slave cylinder.

According to some examples, the method 1000 concludes after 1010. However, in other examples, the method 1000 proceeds to one or more of optional steps 1012, 1014 and/or 1016. At optional step 1012, the pressure value associated with the brake calipers is maintained in response to de-energizing the primary circuit apply valve, the secondary circuit apply valve, the primary circuit master check valve, and the secondary circuit master check valve. At 1014, a determination is made as to whether the brake pressure should be maintained. If so, the method 1000 returns to step 1012 and the pressure value is maintained. If not, the method 1000 proceeds to 1016. At optional step 1016 (i) the primary circuit master check valve and the secondary circuit master check valve are re-energized and (ii) a current supplied to the motor of the slave cylinder is increased until a pressure value associated with brake calipers of respective wheels of the vehicle exceeds respective holding pressures associated with the primary circuit apply valve and the secondary circuit apply valve. Following any of optional steps 1012, 1014 and/or 1016, the method 1000 concludes.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for reducing energy consumption within a braking system of a vehicle, the method comprising the steps of:
   detecting an energy reduction condition associated with the braking system of the vehicle the energy reduction condition being based on at least one of a magnitude of brake pressure and a duration of brake application;
   energizing a primary circuit apply valve and a secondary circuit apply valve to isolate selected portions of the braking system in response to detecting the energy reduction condition, and to maintain an applied pressure level therein;
   de-energizing an energized motor of a slave cylinder of the braking system in response to energizing the primary circuit apply valve and the secondary circuit apply valve;
   de-energizing the primary circuit apply valve and the secondary circuit apply valve of the braking system in response to de-energizing the motor of the slave cylinder,
   and selectively energizing one or more electronic stability control (ESC) outlet valves of the braking system until a pressure value associated with brake calipers of wheels of the vehicle drops to approximately zero,
   wherein the braking system is configured to maintain pressure in said selected portions of the braking system when the circuit apply valves are de-energized.

2. The method of claim 1, wherein selectively energizing the one or more ESC outlet valves is performed in response to detecting a reduction in pressure applied to a brake pedal of the vehicle.

3. The method of claim 1, wherein the primary circuit apply valve and the secondary circuit apply valve are configured to open in response to the pressure value associated with the brake calipers dropping to approximately zero.

4. The method of claim 1, further comprising a step of:
maintaining energization of a primary circuit master check valve and a secondary circuit master check valve of the braking system of the vehicle following de-energization of the primary circuit apply valve and the secondary circuit apply valve.

5. The method of claim 1, wherein energizing the primary circuit apply valve and the secondary circuit apply valve prevents fluid communication from brake calipers of respective wheels of the vehicle to the slave cylinder.

6. A method for reducing energy consumption within a braking system of a vehicle, the method comprising the steps of:
detecting an energy reduction condition associated with the braking system of the vehicle, the energy reduction condition being based on at least one of a magnitude of brake pressure and a duration of brake application;
energizing a primary circuit apply valve and a secondary circuit apply valve to isolate selected portions of the braking system in response to detecting the energy reduction condition, and to maintain an applied pressure level therein;
de-energizing an energized motor of a slave cylinder of the braking system in response to energizing the primary circuit apply valve and the secondary circuit apply valve;
de-energizing the primary circuit apply valve and the secondary circuit apply valve of the braking system in response to de-energizing the motor of the slave cylinder,
and maintaining a pressure value associated with brake calipers of respective wheels of the vehicle in response to de-energizing the primary circuit apply valve and the secondary circuit apply valve, wherein maintaining the pressure value comprises at least one of:
periodically re-applying pressure to the brake calipers;
re-applying pressure to the brake calipers in response to detecting that at least one wheel of the wheels has moved; and
monitoring the pressure value associated with the brake calipers and re-applying pressure to the brake calipers in response to detecting a drop in the pressure value associated with the brake calipers.

7. The method of claim 6, further comprising a step of:
increasing a current supplied to the motor of the slave cylinder until a pressure value associated with brake calipers of respective wheels of the vehicle exceeds respective holding pressures associated with the primary circuit apply valve and the secondary circuit apply valve.

8. The method of claim 7, wherein increasing the current supplied to the motor of the slave cylinder is performed in response to detecting a reduction in pressure applied to a brake pedal of the vehicle.

9. The method of claim 7, wherein the respective holding pressures are the same amount of holding pressure.

10. A system for reducing energy consumption within a braking system of a vehicle, the system comprising:
an energy reduction condition detection module configured to detect an energy reduction condition associated with the braking system of the vehicle, the energy reduction condition being based on at least one of a magnitude of brake pressure and a duration of brake application;
an apply valve control module configured to energize a primary circuit apply valve and a secondary circuit apply valve, the apply valve control module operable to isolate selected portions of the braking system to maintain an applied pressure therein in response to the energy reduction condition detection module detecting the energy reduction condition;
and a slave cylinder control module configured to de-energize an energized motor of a slave cylinder of the braking system in response to the apply valve control module energizing the primary circuit apply valve and the secondary circuit apply valve,
wherein the apply valve control module is further configured to de-energize the primary circuit apply valve and the secondary circuit apply valve of the braking system in response to the slave cylinder control module de-energizing the motor of the slave cylinder,
wherein the system is configured to maintain pressure in said selected portions of the braking system when the circuit apply valves are de-energized,
and wherein the system is operable to selectively energize one or more electronic stability control (ESC) outlet valves of the braking system until a pressure value associated with brake calipers of wheels of the vehicle drops to approximately zero.

* * * * *